UNITED STATES PATENT OFFICE.

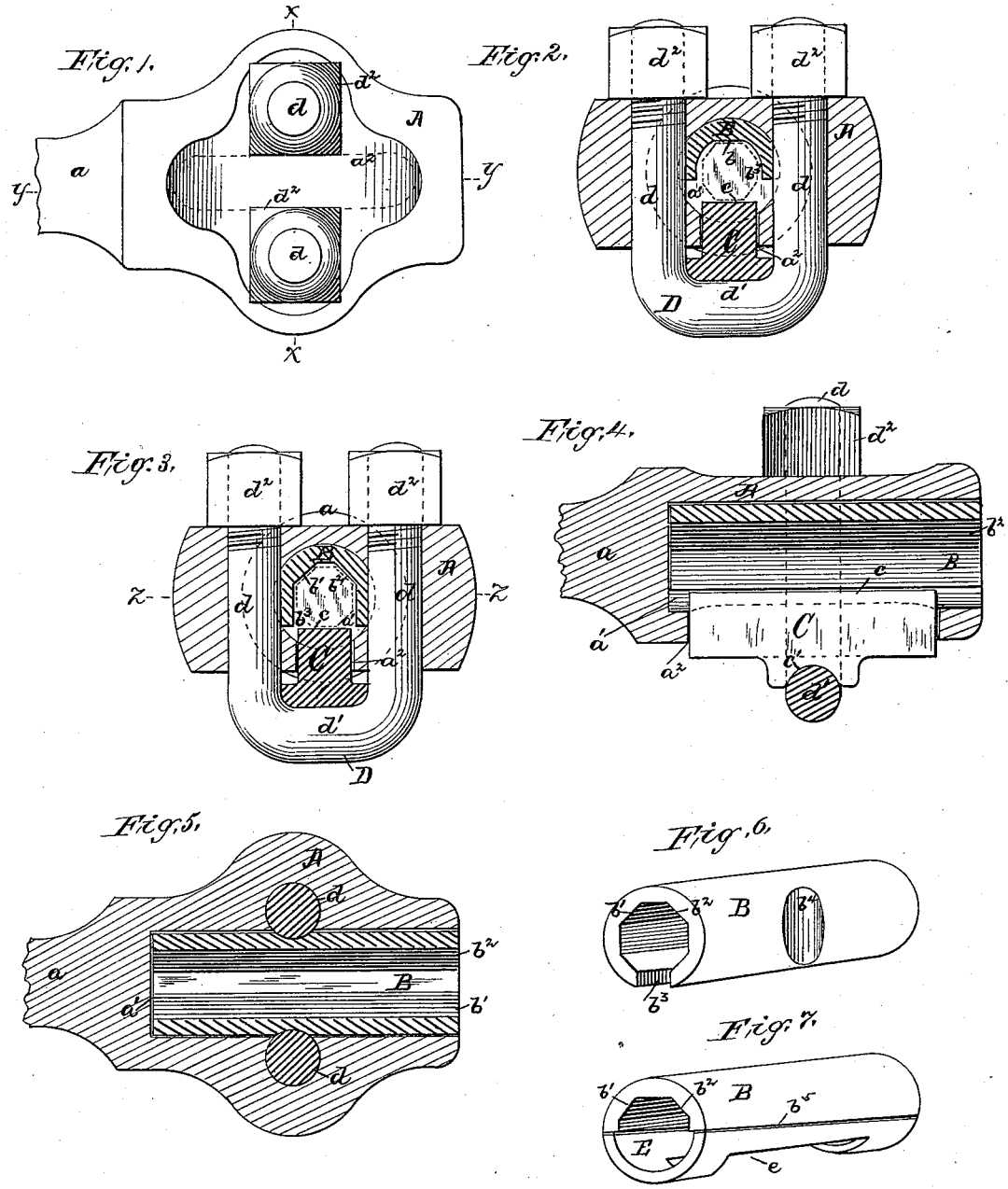

ADDISON C. RAND, OF NEW YORK, N. Y., ASSIGNOR TO THE RAND DRILL COMPANY, OF SAME PLACE.

CHUCK FOR ROCK-DRILLS.

SPECIFICATION forming part of Letters Patent No. 421,612, dated February 18, 1890.

Application filed June 22, 1887. Renewed July 24, 1889. Serial No. 318,548. (No model.)

*To all whom it may concern:*

Be it known that I, ADDISON C. RAND, of the city, county, and State of New York, a citizen of the United States, have invented certain new and useful Improvements in Chucks for Rock-Drills, of which the following is a full, clear, and exact description, reference being had to the accompanying drawings, forming part of this specification.

My invention relates to the chuck in a rock-drill carried by the piston-rod for detachably attaching thereto the drill bar or bit; and my invention consists in the combination, with the hereinafter-described solid and recessed chuck body or shell, of the hereinafter-described bushing seated in the recess in said body or shell and having upon its interior face the bearing face or faces specified, and a key working in a slot in said body or shell and in said bushing, and carrying the hereinafter-described bearing face or faces located (diametrically) opposedly to the bearing face or faces on the bushing, together with devices engaging said key and serving to maintain the key projected inwardly of or permitting it to recede outwardly, wholly or partially, from the chuck, whereby a drill bar or bit constituted from the ordinary octagon steel bars of commerce may be seated in the chuck and held rigidly therein, and may be quickly and easily detached therefrom, all as hereinafter set forth.

Figure 1 is a plan of a drill-chuck containing my invention. Fig. 2 is a vertical cross-section of the same on the line $x\ x$, Fig. 1, and showing my improved bushing with a single bearing-face. Fig. 3 is a similar section of the chuck, showing my improved bushing with two bearing-faces. Fig. 4 is a vertical longitudinal section of the chuck on the line $y\ y$, Fig. 1, and showing the form of bushing indicated in Fig. 3. Fig. 5 is a longitudinal sectional plan of the chuck on the line $z\ z$, Fig. 3, looking toward the bearing-faces of the bushing. Fig. 6 is an end perspective view of my improved bushing detached from the shell of the chuck and showing a form of construction, and Fig. 7 is a similar view of modified form of the bushing and showing a means for holding it seated in the shell of the chuck.

A is the shell or body of the chuck, carried on the end of the piston-rod $a$ for the detachable attaching thereto of the drill bar or bit. (Not shown.)

The body A is composed of a solid piece of metal and is recessed longitudinally from its free end inwardly, as shown at $a'$, to constitute the shell, and this recess is preferably cylindrical. The solid shell is slotted at $a^2$, as shown in broken lines in Fig. 1, from one side inwardly to the recess $a'$. In this slot a key C has play, and said key is of such dimensions as to adapt it to project into the recess $a'$ of the shell A, and it is formed on its inner end with a bearing-face $c$, preferably a plane, as shown plainly in Figs. 2 and 3.

B is a bushing, preferably of chilled or hardened steel, and its external surface is adapted, being preferably clindrical, as shown, to fit to the wall of the recess $a'$ in the shell, as shown. Upon the interior surface or bore of the bushing B, I form a bearing face or faces substantially as shown in the drawings—that is to say, I form said bore with the single bearing-face $b$, preferably a plane, (shown in Fig. 2,) or with two bearing-faces $b'$ and $b^2$, also preferably planes. (Shown in Fig. 3.) The said described bearing face or faces extend longitudinally of the interior face or bore of the bushing, and where a single plane bearing-face $b$ is employed such face is located diametrically opposite to the face of the key C, and such face $b$ and the face $c$ of the key, both being plane faces, are in, therefore, parallel planes, as shown. Where the two bearing-faces $b'$ and $b^2$, as in Fig. 3, are employed, said faces are formed at an angle to each other, and preferably at right angles, as shown, and are located opposedly to the face $c$ of the key C, with their planes at an angle on either side to the face $c$ of the key when said key-face is a plane. The remainder of the bore or interior face of the bushing may be cylindrical, as shown in Fig. 2, or it may be formed of plane faces meeting at angles, as shown in Figs. 3 and 6, and extending longitudinally on the bushing, and when formed as last described it is preferable that the faces shall constitute an octagonal bore or a portion thereof, as shown.

The bushing B may be in the form of a semi-cylinder, as shown in Figs. 2 and 3, and also in Fig. 7. When thus constituted, it may be fabricated as a "drop-forging," in the well-known manner; or it may be formed of a plate of steel bent and worked upon a polysided or octagonal mandrel, giving its interior the form shown in Fig. 6, the exterior being preferably cylindrical to fit to the recess in the shell of the chuck. The edges in the case of the semi-cylinder or of the bushing, (shown in Fig. 6,) being apart or not brought together, a space $b^3$ is left in the bushing B, opposite therein to the bearing-faces on the interior thereof, and such space constitutes an opening in which the key C may work, as shown.

The device or devices which I prefer to employ to engage and operate the key C are as follows: A U-bolt D is provided, the limbs $d$ of which extend through bolt-holes in the body A, and the arch $d'$ of which engages the outer end of the key C, on which end or face there is preferably provided for this purpose the seat $c'$, the said limbs $d$ being provided with fastening-nuts $d^2$, as shown. By turning said nuts down or up the key may be forced inwardly of or permitted to recede from the shell respectively toward and away from the bearing face or faces of the bushing. I do not limit myself to the use of the U-bolt for this purpose, although I consider its employment preferable. Any other known and equivalent device which will force the key inwardly of the shell and bushing and permit it to retreat therefrom may be substituted. The U-bolt may also serve to hold the bushing in place in its seat in the shell A by having the limbs $d$ engage grooves $b^4$ on the exterior of the bushing, the bolt-holes named being made to somewhat intersect the recess $a'$ in the shell for this purpose.

When desired, the semi-cylindrical bushing, as shown in Fig. 7, may be formed with inclined longitudinal edges $b^5$, so as to give the bushing a longitudinal taper, and a semi-cylinder E, having oppositely-inclined edges, may be driven home in the shell-recess after the bushing B is seated, thus serving to hold the operative bushing B firmly in place in said recess. In this case the part E is longitudinally slotted, as at $e$, to permit the play of the key C, as hereinbefore described.

It is evident that by means of my described devices a solid chuck is constituted, having a bushing which is adapted to receive a drill bar or bit formed of an octagonal bar of steel, which is the usual form in which commercial bar steel is manufactured and sold, and that the drill-bar of this shape will be held rigidly yet detachably in the chuck by the bearing upon it of or its being clamped between the oppositely-located faces $b$ of the bushing and $c$ of the key C, or the similarly-located two angle faces $b'$ and $b^2$ of the bushing and said face of the key. In the former instance two diametrically-opposite faces of the octagon steel bar will be engaged by the plane face $b$ of the bushing and the plane face $c$ of the key, as shown in dotted lines in Fig. 2, and in the latter instance two faces of the octagon bar on one side thereof and one face on the opposite side thereof will be engaged respectively by the plane faces $b'$ and $b^2$ of the bushing and the plane face $c$ of the key, as shown in dotted lines in Fig. 3.

I have herein described the face $c$ of the key C as being preferably a plane face; but it is obvious that said bearing-face of the key may be concave, either cylindrically or in the form of two or more plane faces, to fit an octagon, thus constituting an adjustable bearing-face for that side of an octagonal drill-bar which is opposite to the side thereof that engages against the bearing face or faces of the bushing.

I do not claim, broadly, herein the combination, with a drill-chuck, of a bushing, nor do I claim, broadly, the combination of a chuck with an adjustable key for engaging and clamping the drill-bit in the chuck, as I am aware that a bushing has been heretofore used in a longitudinally-split chuck, and that an adjustable key in drill-chucks is not new, broadly. It is my intention to confine my claims hereunder to the combination, with a solid and recessed chuck-body, of the herein-described bushing, which, together with the solid chuck-body, is slotted, as described, and which has upon its bore the longitudinal bearing face or faces set forth, and the described adjustable key projecting into the bushing through the slots therein and in the solid chuck-body, all co-operating as set forth, and constituting a durable, effective, readily adjustable, and economically-constructed drill-chuck for the purpose named.

What I claim as my invention, and desire to secure by Letters Patent, is—

1. In a chuck for rock-drills, the combination, with a solid chuck-body recessed and slotted, as described, of a bushing fitted in said recess and provided with plane bearing-faces (one or more) longitudinal of its bore, and having a slot registering with the slot in the chuck-body, together with a key fitted to play in said slots and carrying a bearing-face opposed to the bearing face or faces of the bushing and adapted to be projected into and withdrawn from the bushing-bore, as and for the purpose specified.

2. In a chuck for rock-drills, the combination, with the solid chuck-body recessed and slotted, as described, of a bushing composed of the semi-cylindrical sections B and E, seated in said recess in the body and having inclined adjacent edges, as specified, the section B having longitudinal bearing-faces (one or more) and the section E being slotted to register with the slot in the body, together with a key fitted to play in said slots and adapted to be projected into and withdrawn from the bushing-bore, as and for the purpose set forth.

ADDISON C. RAND.

Witnesses:
A. S. FITCH,
V. M. BRASCHI.